(12) United States Patent
Luo et al.

(10) Patent No.: US 8,377,606 B2
(45) Date of Patent: Feb. 19, 2013

(54) PARAFFIN FUEL CELL

(75) Inventors: Jingli Luo, Edmonton (CA); Karl Chuang, Edmonton (CA); Alan Rodney Sanger, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 125 days.

(21) Appl. No.: 12/928,581

(22) Filed: Dec. 15, 2010

(65) Prior Publication Data

US 2011/0171560 A1 Jul. 14, 2011

Related U.S. Application Data

(62) Division of application No. 11/642,351, filed on Dec. 20, 2006, now Pat. No. 7,977,006.

(51) Int. Cl.
*H01M 8/10* (2006.01)
*C04B 35/49* (2006.01)

(52) U.S. Cl. ........ 429/479; 429/486; 501/137; 501/138; 501/139

(58) Field of Classification Search .................. None
See application file for complete search history.

(56) References Cited

U.S. PATENT DOCUMENTS

| | | | |
|---|---|---|---|
| 3,432,352 A | 3/1969 | Tragert et al. | |
| 5,273,628 A | 12/1993 | Liu et al. | 205/344 |
| 5,306,411 A * | 4/1994 | Mazanec et al. | 204/265 |
| 5,403,461 A * | 4/1995 | Tuller et al. | 204/252 |
| 6,517,693 B2 * | 2/2003 | Taniguchi | 204/421 |

FOREIGN PATENT DOCUMENTS

WO WO/02/03832 5/2002

OTHER PUBLICATIONS

"Solid Oxide Fuel Cells Operating Without Using an Anode Material", Hirabayashi et al., Solid State Ionics 168 (2004) 23-29.
"Thin Film Preparation and Hydrogen Pumping Characteristics of BaCe0.8Y0.2LfO(3-ä))", Lee et al., Soid State Ionics 176 (2005) 1479-1484.
"Proton Conducting Ceramics for Use in Intermediate Temperature Proton Conducting Fuel Cell", Browning et al., Jr. of New Materials for Electrochemical Systems, 5 (2002) 25-30.
Yu Feng, Jungli Luo, Karl T. Chuang, Conversion of Propane to Propylene in a Proton-Conducing Solid Oxide Fuel Cell, ScienceDirect, 2007, 123-128, ScienceDirect.com.
Y. Feng, J. Luo, S. Wang, J. Melnik, K.T. Chuang, Investigation of Y-Doped BaCeO3 as Electrolyte . . . , Department of Chemical and Materials Engineering University of Alberta.
Y. Feng, et al., Paper Titled: Analysis and Improvement of Chemical Stability of Y-Doped . . . , 6th Int Symp on New Mat for Electrochemical Sys, Montreal, Jul. 9-12, 2006.

* cited by examiner

*Primary Examiner* — Barbara Gilliam
*Assistant Examiner* — Adam A Arciero
(74) *Attorney, Agent, or Firm* — Kenneth H Johnson

(57) ABSTRACT

The present invention provides a fuel cell in which electricity is generated and a paraffin is converted to an olefin. Between the anode and cathode compartment of the fuel cell is a ceramic membrane of the formula $BaCe_{0.85-e}A_eL_fY_{0.05-0.25}O_{(3-\delta)}$ wherein A is selected from the group consisting of Hf and Zr and mixtures thereof, e is from 0.1 to 0.5, L is a lanthanide and f is from 0 to 0.25 and $\delta$ is the oxygen deficiency in the ceramic.

18 Claims, 3 Drawing Sheets

PARAFFIN FUEL CELL

This is a division of application Ser. No. 11/642,351 filed on Dec. 20, 2006 now U.S. Pat. No. 7,977,006.

FIELD OF THE INVENTION

The present invention relates to the conversion of alkanes or paraffins (e.g. ethane) to corresponding alkenes (e.g. ethylene) in a fuel cell and thereby also to generate electricity and water. The present invention also relates to ceramic compositions that may be used to make conductive ceramic membranes and membranes per se.

BACKGROUND OF THE INVENTION

There are a number of patents which disclose fuel cells having a polymeric membrane. These include for example WO 02/38832 published May 16, 2002 in the name of the University of Alberta. This type of reference fails to disclose a ceramic suitable for use as a membrane in a fuel cell.

U.S. Pat. No. 5,139,541 issued Aug. 18, 1992 to Edlund assigned to Bend Research, Inc. discloses a composite membrane for use in separation purification of hydrogen. The membrane comprises two non-porous hydrogen permeable foils or membranes about 30 microns thick separated by an intermetallic (foil) barrier layer which prevents metallic diffusion between the two foils. The patent does not teach or suggest ceramic membranes or electrolyte.

U.S. Pat. No. 6,125,987 issued Nov. 28, 2000 to Ma, et al. assigned to Worcester Polytechnic Institute is similar except one of the metal membranes is a porous metallic membrane. Again the patent teaches against ceramics.

U.S. Pat. No. 5,229,102 issued Jul. 20, 1993 to Minet, et al. assigned to Medalert, Inc. teaches a steam reforming process conducted inside a heated metal ceramic. The ceramic is alumina. The patent fails to teach a fuel cell nor does it teach converting alkanes to alkenes. The patent teaches the reformatting of methane to mainly carbon monoxide and hydrogen. The reference teaches away from the present invention.

U.S. Pat. No. 6,821,501 issued Nov. 23, 2004 to Matzokos, et al. assigned to Shell Oil Company teaches a fuel cell using a ceramic support for the membrane. The ceramic support is typically alumina. The membrane is typically a group VIII metal, preferably Pd and Pd alloys. The feed is a vapourizable hydrocarbon and the off gas is largely hydrogen and $CO_2$ without generating an alkene. The reference teaches away from the subject matter of the present invention.

There are a number of papers which disclose the use of $BaCeO_3$ doped with about 15% of Y (BCY 15) as a proton conducting membrane for the dehydrogenation of propane to propylene with the production of electricity and water. The papers include:
Yu Feng, Jingli Luo, Shouyan Wang, Juni Melnik and Karl T. Chuang, "Investigation of Y-doped $BaCeO_3$ as Electrolyte in Propane Fueled Proton Conducting Solid Oxide Fuel Cell", Proceedings of the Fuel Cell and Hydrogen Technologies, D. Ghosh, Edt. 44$^{th}$ Annual Conference of Metallurgists of CIM, MET SOC, Montreal, Quebec, pp. 461-472, 2005. (Yu Feng presented this paper in the symposium of Fuel Cell and Hydrogen Technologies, 44$^{th}$ annual Conference of Metallurgists of CIM, Calgary, August 2005); and
Yu Feng, Jingli Luo, and Karl T. Chuang; "Analysis and Improvement of Chemical Stability of Y-Doped $BaCeO_3$ as Proton-Conducting Electrolytes in $C_3H_8$—$O_2$ Fuel Cells" which was presented at the 6th International Symposium on New Materials for Electrochemical Systems, Montreal, Jul. 9-12, 2006. As requested by the conference, the manuscript was submitted to the Journal of New Materials for Electrochemical Systems in May 2006.

These papers do not disclose the ceramic compositions of the present invention.

The paper "Conversion of Propane to Propylene in a Proton Conducting Solid Oxide Fuel Cell" by Yu Feng, Jingli Luo, and Karl T. Chuang, to be published in Fuel by Elsevier, also only discloses the use of BCY15 as a membrane. These papers do not disclose the subject matter of the present invention.

The present invention also seeks to provide a novel proton conducting ceramic useful as a membrane in a fuel cell to convert alkanes to alkenes and the membrane per se.

SUMMARY OF THE INVENTION

The present invention provides a ceramic perovskite, consisting essentially of:
$BaCe_{0.85-e}A_e L_f Y_{0.05-0.25} O_{(3-\delta)}$ wherein A is selected from the group consisting of Hf and Zr and mixtures thereof, e is from 0.1 to 0.5, L is a lanthanide and f is from 0 to 0.25 and $\delta$ is the oxygen deficiency in the ceramic.

The present invention further provides a fuel cell comprising an anode compartment and a cathode compartment and hermetically sealed there between an electrolytic proton conducting ceramic membrane of the above formula.

The present invention further provides a process to generate an electrical current comprising:
feeding to the anode compartment of the above noted fuel cell at a temperature from 500° C. to 900° C. a gaseous stream comprising at least 75 weight % of one or more $C_{2-8}$ alkanes and removing from the anode compartment a stream comprising unreacted alkane feed one or more corresponding $C_{2-8}$ alkenes and isomers thereof, feeding to the cathode compartment of said fuel cell a gaseous stream comprising at least 20 weight % of oxygen and removing from the cathode compartment unreacted cathode feed and water.

The present invention further provides a ceramic membrane of the above formula.

DETAILED DESCRIPTION

Figure 1:
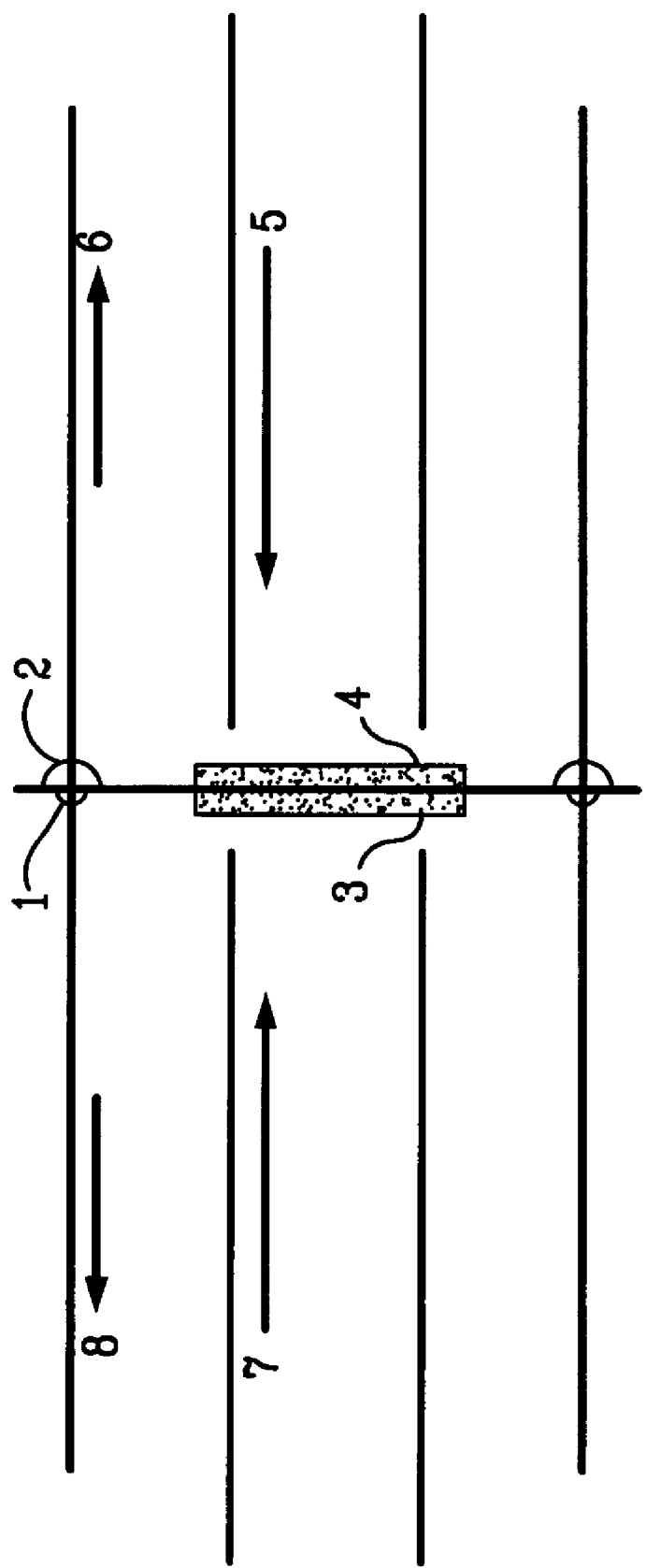
FIG. 1 is a sketch of a fuel cell in accordance with the present invention.

As used in this specification alkane means a saturated hydrocarbon, sometimes also referred to as a paraffin.

As used in this specification alkene means a hydrocarbon having an unsaturated double bond.

As used in this specification the phrase oxygen vacancy of the ceramic means that the number of oxygen ions present in the crystal lattice structure of the ceramic is less than that which would be present in a well ordered and complete lattice. In the case of an oxygen deficiency, the number of oxide ions is less than that needed to balance the total number of positive charges of all metal atoms of the parent structure if they were all present in their normal oxidation states. This can be achieved in three ways: partial substitution of a lower oxidation state ion for a higher oxidation state ion, or partial reduction of a fraction of the high oxidation state ions to a lower oxidation state, or substitution for an ion of higher charge with one of lower charge, for example $M^{4+}$ replaced by a different $M^{2+}$. There are three consequences. The formula of the ceramic deviates from the stoichiometric formula of the parent structure as there are less than the expected number of oxide ions. There are vacant sites spaced throughout the crystal lattice structure of the ceramic at which there would normally be expected to be an oxide ion. In order to balance the charges on the ions, some of the metal ions have a lower oxidation state than would occur in the stoichiometric formulation of the parent structure.

The ceramic compositions used in the present invention are prepared from metal oxides or, in some cases, materials from which a metal oxide can be generated such as the corresponding carbonate. Typically metal oxides or precursors having a purity not less than 95%, preferably not less than 98%, most preferably not less than 99.9% are ball milled in a hydrocarbon diluent such as one or more lower ($C_{6-10}$) alkanes (paraffins) or iso-paraffins such as the ISOPAR® series of products, or $C_{1-10}$ alcohols, for a time from 18 to 36 hours, preferably from 20 to 28 hours, most preferably from 22 to 26 hours. One useful diluent is iso-propanol. The resulting slurry is dried and the sintered in air at a temperature from about 1400° C. to about 1700° C., preferably from 1500° C. to about 1600° C., most preferably from 1525° C. to about 1575° C. for from about 1 to 5 hours, typically 2 to 4 hours, to produce a single phase compound. The resulting powder is then pressed at conventional pressures (e.g. from at least 20 MPA, typically at least 30 MPA) to produce a ceramic part (membrane) and sintered as described above, to produce a green ceramic part having at least 90%, preferably 95%, of the theoretical density. The starting oxides, or carbonates from which said oxides can be derived, may be selected from the group consisting of $BaCO_3$, $CeO_2$, $Y_2O_3$, $ZrO_2$, $HfO$, and $Pr_6O_{11}$. If desired, intermediate materials could be used as starting materials. For example, rather than mixing all of the oxides, a starting intermediate of BCY 15 ($BaCe_{0.85}Y_{0.15}O_{3-\delta}$) could be used. Optionally, if a porous material is desired rather than a high density material for use as a component of the electrode material, pore formers such as corn starch, graphite, and finely ground polymers such as poly(methyl methacrylate) or polyethylene may be included in the ball milling step or the compression step. A combination of up to about 35 weight % of one or more pore formers may be used such as up to 16% weight % of corn starch and up to 16 weight % graphite based on the final weight of the composition prior to further sintering. A preferred pore size in the finished ceramic part is from 1 to 5 µm preferably from 2 to 3 µm. The ratio of the above noted oxides is selected to give the required empirical formula for the ceramic.

The ceramic in accordance with the present invention has the formula $BaCe_{0.85-e}A_eL_fY_{0.05-0.25}O_{(3-\delta)}$ wherein A is selected from the group consisting of Hf and Zr and mixtures thereof, e is from 0.1 to 0.5, L is a lanthanide and f is from 0 to 0.25 and δ is the oxygen deficiency in the ceramic. A preferred lanthanide is Pr. In a preferred embodiment when A is Zr, e is from 0.25 to 0.35 and f is from 0.05 to 0.2. Preferably, in this embodiment the lanthanide dopant is Pr and f is from 0.15 to 0.2. In an alternate embodiment A is Hf, e is from 0.15 to 0.25 and f is from 0.05 to 0.2. Preferably, the lanthanide dopant is Pr and f is from 0.10 to 0.2.

Referring to FIG. 1, the resulting sintered part is a membrane 11 the opposed surfaces 13, 14 of which typically are ground and will act as part of the anode chamber 9 or cathode chamber 10 of a fuel cell 100. The membrane surfaces are first ground to remove segregated surface oxides arising from the sintering such as $CeO_2$, and $PrO_2$, and to reduce the thickness to the appropriate size. The thickness of membrane 11 should be minimized to optimize performance of fuel cell 100, but should be sufficiently thick so as to be strong enough to sustain physical integrity. In laboratory applications membrane 11 may have a thickness from about 0.5 to 2 mm, preferably from about 0.5 to 1 mm. In industrial applications membrane 11 could be much thinner.

An electrode 3, 4 is applied to each of opposed faces 13, 14 of ceramic membrane 11 which will be used in fuel cell 100. Generally cathode 4 includes a catalyst selected from oxygen activation catalysts and anode 3 includes catalysts selected from the group consisting of hydrocarbon activation catalysts. The electrode material used in the present invention typically is prepared as a paste. The electrode for both anode 3 and cathode 4 may be a precious metal such as Pt or Pd, preferably Pt paste. Platinum paste is commercially available for example from Hereaus Inc., CL-5100. The anode catalyst may be selected from the group consisting of platinum, mixtures of copper and copper chromite, and mixtures of iron, platinum and chromia. To prepare 48% Fe-4% Pt-48% $Cr_2O_3$ catalyst, firstly nano $Cr_2O_3$ powder is added to a 0.5M $Fe(NO_3)_2$ solution with electromagnetic stirring. After the solvent has been evaporated under low heat (e.g. temperature less than 150° C., preferably less than 120° C.), the resulting dry powder is added to a solution of tetra-ammine-platinum nitrate (5% Pt) with electromagnetic stirring. This mixed solution is heated, on low heat as described above to evaporate solvent and produce dry powder, which is reduced in flowing $H_2$ at 300° C. for 30 hours to form 48% Fe-4% Pt-48% $Cr_2O_3$ anode catalyst. The anode and cathode catalysts may be applied to the faces of the ceramic membrane by any suitable means. One method is by screen printing to provide an electrode catalyst surface. The surface is dried at from room temperature to temperatures up to 120° C. overnight. If desired a mesh may be placed over the electrode catalyst to collect current.

As shown in FIG. 1, fuel cell 100 comprises an anode chamber or compartment 9 and a cathode chamber or compartment 10 having there between ceramic membrane 11 coated at opposed faces 13, 14 with the appropriate anode electrode catalyst 3 and cathode electrode catalyst 4 respectively. Anode chamber 9 and cathode chamber 10 are hermetically sealed using a high temperature ceramic sealant 1, 2 about ceramic membrane 11 described above. A number of sealants are known but ceramic sealers such as AREMCO® 503 and most preferably glass sealants such as AREMCO® 617 may be used to hermetically seal fuel cell compartments 9 and 10.

Fuel cell 100 generally operates at a temperature from 500° C. to 900° C., preferably 600° C. to 800° C. Heat may be provided by any conventional source such as electric heaters or fired heaters. To some extent this may depend on the feed and its heat value.

Cathode compartment 10 is fed with cathode feed stream 5 comprising at least 20 weight % of oxygen. Preferably cathode compartment 10 is fed with stream 5 comprising a higher amount of oxygen typically greater than 60 weight % preferably greater than 75 weight % most preferably greater than 90 weight % oxygen most desirably greater than 95 weight % of pure oxygen. The feed to the cathode compartment may be lightly humidified. It may comprise from about 5 to 10% more water vapour than in the ambient environment. The exhaust stream 6 from the cathode compartment 10 comprises water vapor and unconsumed cathode feed gas.

The feed and exhaust ports may be any of a number of well known designs. There could be separate spaced apart ports for the feed and exhaust or the ports could be provided by concentric ports with oxygen feed 5 directed towards the central part of the cathode electrode catalyst 4 and exhaust stream 6 being drawn off from the periphery of anode 4.

The anode feed stream 7 to anode compartment 9 may comprise at least 75 weight % of one or more $C_{2-8}$ alkanes. Preferably the anode feed may comprise 80 weight % of one or more alkanes selected from the group consisting of ethane, propane, butane, pentane, hexane and octane. Preferably for low boiling alkanes the anode feed is quite pure, preferably over 90 weight %, most preferably over 95 weight %, relative to one alkane such as for example ethane. One of the advantages of the process of the present invention is selectivity. If you feed essentially an essentially pure low boiling alkane to fuel cell 100 the product stream 8 is a mixture of the alkane and the corresponding alkene (e.g. ethane gives ethylene and ethane). When anode feed stream 7 is a relatively pure alkane stream, anode exhaust stream 8 also contains essentially only the corresponding alkene and no significant amounts of other alkenes. This reduces the energy costs to separate close alkenes (e.g. the compressor costs and cost of cryogenic separation to separate methane from ethylene from propylene).

Anode feed stream 7 is normally dry. The atmosphere in cathode compartment 10 is partially humidified by product water. It was found that the performance of the fuel cell was improved by the presence of light humidification.

EXAMPLES

The present invention will now be illustrated by the following non-limiting examples.

Example 1

Components and Preparation

Compositions of $BaCe_{0.46}Zr_{0.30}Y_{(0.05-0.15)}Pr_{(0.05-0.15)}O_{(3-\delta)}$ (BCZYP) and $BaCe_{0.55}Hf_{0.2}Y_{(0.05-0.15)}Pr_{(0.05-0.15)}O_{(3-\delta)}$ (BCHYP) were prepared as follows.

Solid state reactions were used to prepare BCZYP and BCHYP membranes, using the following methodology. Polycrystalline powders of BCZYP and BCHYP were synthesized from high purity $BaCO_3$ and nanopowders of $CeO_2$, $ZrO_2$, $HfO_2$, $Y_2O_3$ and $Pr_6O_{11}$ in amounts to give the required formula that were mixed, ball-milled and the resulting raw mixes were calcined at 1350° C. for 10 hours in air. The resulting materials were again ball-milled, pressed into disks (20 mm diameter) and sintered at 1600° C. for 12 hours in air. The sintered samples normally had densities in the range 90-96% of theoretical values, as determined from their weights and volumes. Minor loss of BaO during sintering resulted in the formation of $CeO_2$ and $PrO_2$ on the surfaces. Consequently, surface layers which contained the decomposed material were removed by polishing both sides of the membrane. Screen printed platinum electrodes were applied to each face of the membrane.

Preparation of Iron and Platinum Mixed with Nano-$Cr_2O_3$ for Electrode Catalyst.

To prepare 48% Fe-4% Pt-48% $Cr_2O_3$ catalyst, firstly nano $Cr_2O_3$ powder was added to a 0.5M $Fe(NO_3)_2$ solution with electromagnetic stirring with mild heating. After the solvent had evaporated, the resulting dry powder was added to a solution of tetra-ammine-platinum (II) nitrate (5% Pt) with electromagnetic stirring. This mixed solution was heated to evaporate solvent and produce dry powder, which then was reduced in flowing $H_2$ at 300° C. for 30 hours to form 48% Fe-4% Pt-48% $Cr_2O_3$.

Example 2

Stability of BCZYP and BCHYP

The chemical stability of the perovskites (BCZYP and BCHYP) in atmospheres containing $CO_2$, was demonstrated as unstable electrolytes have little or no value for the proposed applications. Thermogravimetric analysis (TGA) showed that BCY ($BaCe_{0.85}Y_{0.15}O_{(3-\alpha)}$) reacts with $CO_2$ to form carbonate at temperatures over 500° C. The carbonate components of mixtures so formed from BCY lose $CO_2$ at temperatures over 1050° C. In contrast, the multi-doped perovskites, BCZYP and BCHYP, did not react with $CO_2$ in the temperature range 200-1300° C.

Example 3

A simple fuel cell 100 was prepared by sealing a tube 16,17 onto each of the opposed faces 13,14 of the prepared ceramic membrane 11 with Pt catalysts/electrodes 3, 4 on the respective surfaces 13,14. An approximately concentric inner tube 18,19 was then inserted into each of first tubes 16,17 to act as a feed tube. Outer tubes 16,17 acted as the corresponding exhaust tubes or ports. Current collectors 21, 22 were attached to each catalyst/electrode 3, 4 and were used to measure current and current density. The entire cell 100 was placed in an oven (not shown) heated to various temperatures and ethane was the anode feed stream 7 fed to anode 3 in anode compartment 9 and 20% oxygen was the cathode feed stream 5 fed to cathode compartment 10.

Typical I-V curves with low open circuit voltage (OCV), also called open circuit potential, were achieved using a $C_2H_6$—$O_2$ fuel cell with 0.61 mm thickness BCZYP membrane as electrolyte and platinum paste as both electrodes showed a low OCV of about 0.8 V. Low OCV had been observed previously for fuel cells using Pr containing electrolytes, and this was shown to be a consequence of mixed protonic and electronic conductivity. Therefore, the low OCV of fuel cells using BCZYP electrolyte also probably was caused by mixed proton, oxygen ion and hole conductivity of the electrolyte. The different types of conductivity arise from different ionic and hole defects. Defects can interact with each other, resulting in a partial shortcut in the inner circuit of a fuel cell. The result was maximum power densities of 7.5, 34, and 56 mW/cm² at 650, 700, and 750° C., respectively, at corresponding current densities of 25, 89, and 150 mA/cm². The flow rates of $C_2H_6$ and $O_2$ were 100 mL/min.

Figure 2:
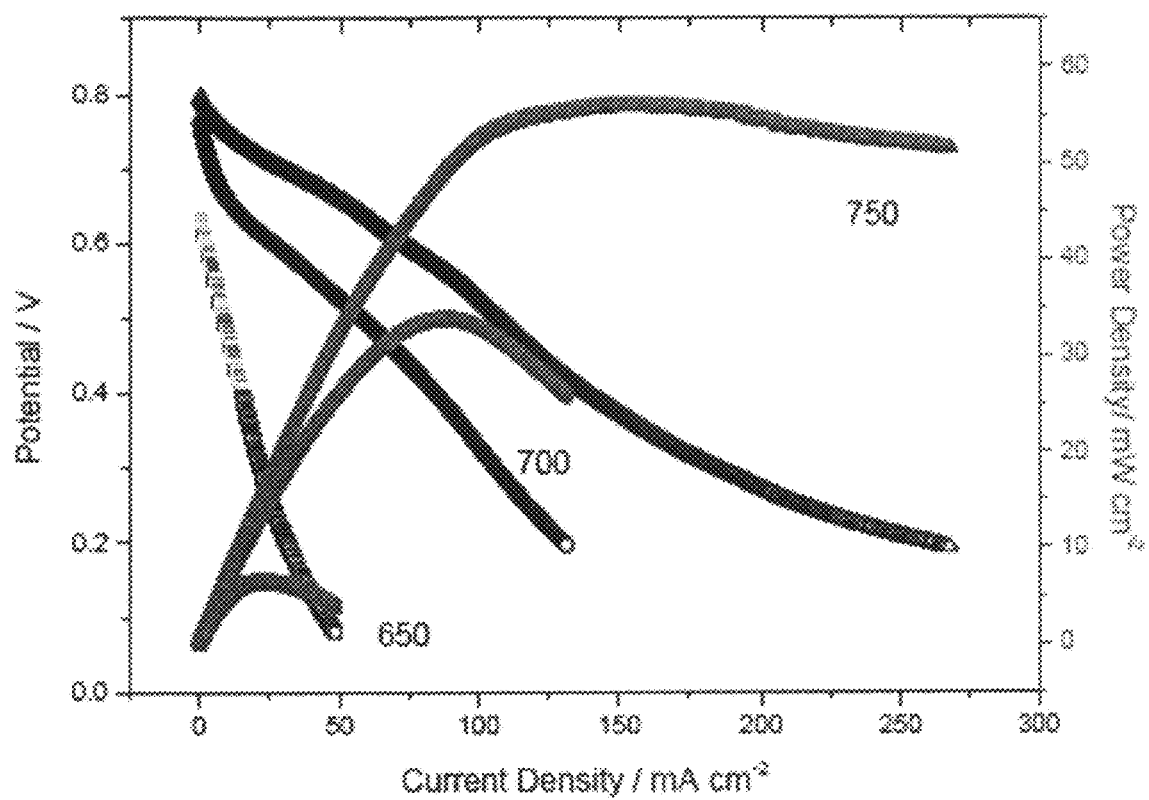
FIG. 2 is a graph of current density-voltage (open markers) and current density-power density curves (solid markers) of $C_2H_6$—$O_2$ fuel cells with a BCHYP membrane and Pt paste as both anode and cathode electrodes at 650° C. (Squares), 700° C. (Circles) and 750° C. (Triangles).

The results of the test are presented graphically in FIG. 2.

When BCZYP was used as the electrolyte in the fuel cells, the ethane conversion improved to 77.2%, while the ethylene selectivity reduced to 39.8%. For a BCY15 electrolyte fuel cell operated at 700° C., the ethane conversion and ethylene selectivity were 33.7% and 96.3%, respectively. The increased ethane conversion and reduced ethylene selectivity might be a consequence of the mixed proton, oxygen ion and hole conductivity of Pr containing electrolyte. As raw material $Pr_6O_{11}$ is a non-stoichiometric compound and Pr exhibits two valences (+3 and +4). It is thought that Pr in BCZYP and BCHYP also exhibits two valences, and $Pr^{3+}$ still has one free f-electron which might be easily activated at high temperature.

Figure 3:
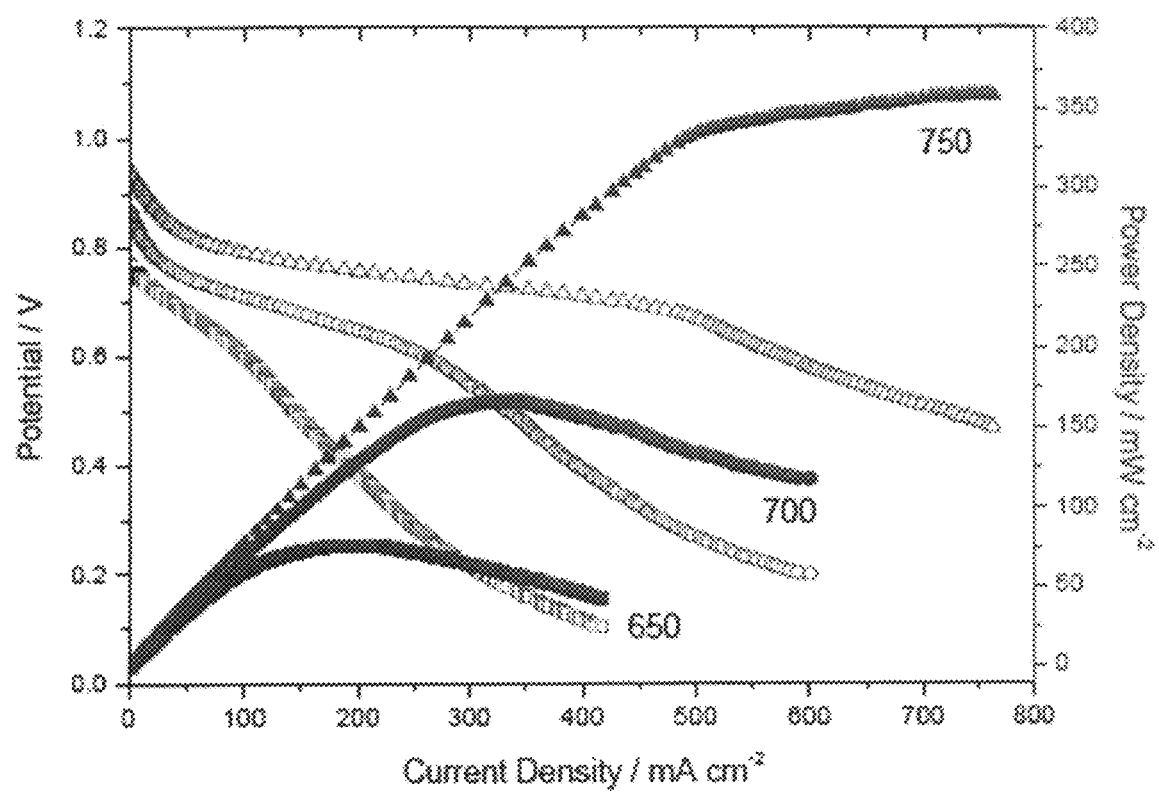
FIG. 3 is a graph of current density-voltage (open markers) and current density-power density curves (solid markers) of $C_2H_6$—$O_2$ fuel cells with BCHYP membrane and Pt paste as both anode and cathode electrodes at 650° C. (Squares), 700° C. (Circles) and 750° C. (Triangles).

Referring to FIG. 3, typical I-V curves with low starting voltages again were achieved when using a substantially similar $C_2H_6$—$O_2$ fuel cell 100 having 1 mm BCHYP as electrolyte and platinum paste as both electrodes, which also showed a low OCV of about 0.9 V. Low OVC of fuel cell using BCHYP electrolyte is again attributable to mixed proton, oxygen ion and hole conductivity. The maximum power densities were 77, 167, and 359 mW/cm$^2$ at 650, 700, and 750° C., respectively, corresponding to current densities of 200, 340, and 750 mA/cm$^2$.

The results are shown FIG. 3. The flow rates of $C_2H_6$ and $O_2$ were 100 mL/min.

The electrical performance of BCHYP was comparable to that of BCY15 electrolyte, which showed a maximum power density of 174 mW/cm$^2$ and a current density of 320 mA/cm$^2$ at 700° C. The ethane conversion improved to 77.2% when BCZYP was used as the electrolyte in the fuel cells, while the ethylene selectivity reduced to 39.8%. For a BCY15 electrolyte fuel cell operated at 700° C., the ethane conversion and ethylene selectivity were 33.7% and 96.3%, respectively. The increased ethane conversion and reduced ethylene selectivity might be a consequence of the mixed proton, oxygen ion and hole conductivity of Pr containing electrolyte. As raw material $Pr_6O_1$ is a non-stoichiometric compound and Pr exhibits two valences (+3 and +4). It is thought that Pr in BCZYP and BCHYP also exhibits two valences, and $Pr^{3+}$ still has one free f-electron which might be easily activated at high temperature.

Example 4

The $C_2H_6$—$O_2$ fuel cell as above, except that the membrane was PCY 15 and the anode electrode/catalyst was iron and platinum mixed with nano-$Cr_2O_3$ for electrode catalyst as prepared above, showed a steady OCV of 1.08 V at both 650° C. and 700° C. At 650° C., $C_2H_6$—$O_2$ fuel cell using the new anode catalyst delivered a maximum power density of only 47 mW/cm$^2$ and a corresponding current density of 78 mA/cm$^2$. When the fuel cell was operated at 700° C., the maximum power density was improved to 243 mW/cm$^2$ and the corresponding current density also was enhanced to 540 mA/cm$^2$. This cell performance improvement was attributed to the reduction of cell impedance from 26.8 Ohm at 650° C. to 10.8 Ohm at 700° C.

The foregoing examples demonstrate the feasibility of the present invention.

What is claimed is:

1. A process to generate an electrical current comprising: feeding to the anode compartment of a fuel cell comprising an anode compartment and a cathode compartment and hermetically sealed there between an electrolytic proton conducting ceramic membrane consisting essentially of: $BaCe_{0.85-e}Hf_eL_fY_{0.05-0.25}O_{(3-\delta)}$ Hf, e is from 0.1 to 0.5, L is a lanthanide and f is from 0 to 0.25 and δ is the oxygen deficiency in the ceramic at a temperature from 500° C. to 900° C. a gaseous stream comprising at least 75 weight % of one or more $C_{2-8}$ alkanes and removing from the anode compartment a stream comprising unreacted alkane feed one or more corresponding $C_{2-8}$ alkenes and isomers thereof, feeding to the cathode compartment of said fuel cell a gaseous stream comprising at least 20 weight % of oxygen and removing from the cathode compartment unreacted cathode feed and water.

2. The process according to claim 1, wherein the cathode includes a catalyst selected from oxygen activation catalysts.

3. The process according to claim 1, wherein the anode is selected from the group consisting of hydrocarbon activation catalysts.

4. The process according to claim 3, wherein the feed to the cathode compartment is humidified.

5. The process according to claim 1, wherein the fuel cell is at a temperature from 600° C. to 800° C.

6. The process according to claim 3, wherein the anode is selected from the group consisting of platinum, mixtures of copper and copper chromite, and mixtures of iron, platinum and chromia.

7. The process according to claim 2, wherein the cathode is Pt.

8. The process according to claim 1, wherein in the ceramic membrane A is Zr and e is from 0.25 to 0.35.

9. The process according to claim 8, wherein in the ceramic membrane f is from 0.05 to 0.2.

10. The process according to claim 8, wherein in the ceramic membrane the lanthanide dopant is Pr and f is from 0.15 to 0.2.

11. The process according to claim 1, wherein the feed to the anode comprises 80 weight % of one or more alkanes selected from the group consisting of ethane, propane, butane, pentane, hexane and octane.

12. The process according to claim 11, wherein the feed to the anode comprises 80 weight % of ethane.

13. A process to generate an electrical current comprising: feeding to the anode compartment of a fuel cell comprising an anode compartment and a cathode compartment and hermetically sealed there between an electrolytic proton conducting ceramic membrane consisting essentially of: $BaCe_{0.85-e}Hf_eL_fY_{0.05-0.25}O_{(3-\delta)}$, e is from 0.15 to 0.25, L is a lanthanide and f is from 0 to 0.25 and δ is the oxygen deficiency in the ceramic at a temperature from 500° C. to 900° C. a gaseous stream comprising at least 75 weight % of one or more $C_{2-8}$ alkanes and removing from the anode compartment a stream comprising unreacted alkane feed one or more corresponding $C_{2-8}$ alkenes and isomers thereof, feeding to the cathode compartment of said fuel cell a gaseous stream comprising at least 20 weight % of oxygen and removing from the cathode compartment unreacted cathode feed and water.

14. The process according to claim 13, wherein in the ceramic membrane f is from 0.05 to 0.2.

15. The process according to claim 13, wherein in the ceramic membrane the lanthanide dopant is Pr and f is from 0.10 to 0.2.

16. The process according to claim 13, wherein in the ceramic membrane the lanthanide dopant is Pr and f is from 0.15 to 0.2.

17. The process according to claim 16, wherein the feed to the anode comprises at least 80 weight % of one or more alkanes selected from the group consisting of ethane, propane, butane, pentane, and hexane.

18. The process according to claim 17, wherein the feed to the anode comprises at least 80 weight % of ethane.

* * * * *